(12) United States Patent
Shinagawa et al.

(10) Patent No.: US 12,725,083 B2
(45) Date of Patent: Sep. 1, 2026

(54) TRAINING DEVICE, METHOD, NON-TRANSITORY COMPUTER READABLE MEDIUM, AND INFERRING DEVICE

(71) Applicant: Preferred Networks, Inc., Tokyo (JP)

(72) Inventors: Chikashi Shinagawa, Tokyo (JP); So Takamoto, Tokyo (JP); Iori Kurata, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 475 days.

(21) Appl. No.: 18/534,130

(22) Filed: Dec. 8, 2023

(65) Prior Publication Data

US 2024/0127121 A1 Apr. 18, 2024

Related U.S. Application Data

(63) Continuation of application No. PCT/JP2022/023523, filed on Jun. 10, 2022.

(30) Foreign Application Priority Data

Jun. 11, 2021 (JP) ................................ 2021-098304

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
None
See application file for complete search history.

(56) References Cited

FOREIGN PATENT DOCUMENTS

WO WO-2020163967 A1 * 8/2020 ............ G06N 3/048

OTHER PUBLICATIONS

Lowik Chanussot et al., “Open Catalyst 2020 (OC20) Dataset and Community Challenges”, ACS Catalysis, May 4, 2021, pp. 6059-6072, vol. 11, No. 10 (14 pages).

Lowik Chanussot et al., “The Open Catalyst 2020 (OC20) Dataset and Community Challenges”, Mar. 16, 2021, pp. 1-37, arXiv:2010.09990v4 [cond-mat.mtrl-sci] (37 pages).

* cited by examiner

*Primary Examiner* — David R Vincent
(74) *Attorney, Agent, or Firm* — Foley & Lardner LLP

(57) ABSTRACT

A training device includes processor. The processor inputs a first atomic structure including a surface and an adsorbed molecule close to the surface into a model to obtain an energy outputted from the model in response to the input, and obtains a first error based on the outputted energy of the first atomic structure and a ground truth value of the energy of the first atomic structure, input a fourth atomic structure including a cluster and an adsorbed molecule close to the cluster into the model to obtain an energy outputted from the model in response to the input, and obtains a fourth error based on the outputted energy of the fourth atomic structure and a ground truth value of the energy of the fourth atomic structure, and update a parameter of the model by the first and the fourth error. The surface and the cluster include the same atom.

21 Claims, 10 Drawing Sheets

TRAINING DEVICE, METHOD, NON-TRANSITORY COMPUTER READABLE MEDIUM, AND INFERRING DEVICE

CROSS REFERENCE TO RELATED APPLICATIONS

This application is continuation application of International Application No. JP2022/023523, filed on Jun. 10, 2022, which claims priority to Japanese Patent Application No. 2021-098304, filed on Jun. 11, 2021, the entire contents of which are incorporated herein by reference.

FIELD

This disclosure relates to a training device, a method, a non-transitory computer readable medium, and an inferring device.

BACKGROUND

Adsorption energy is the amount of energy change when the state stabilizes due to the adsorption of molecules onto a surface. Specifically, adsorption energy is calculated as a difference between "E(slab+molecule) being the energy of (surface+molecule)" and "E(slab) being the energy of (surface)+E(molecule) being the energy of (molecule by itself)". There is a method for generating Neural Network Potential (NNP) capable of reproducing adsorption energy, and in this method, a data set and a model which are found as a result of Density Functional Theory (DFT) calculation regarding surface+molecule are made public. Adsorption energy not only to a surface but also to a cluster can be defined, and an attempt to generate NNP capable of reproducing it has also been made.

However, adsorption energy has a small value such as 1 eV. In the case where adsorption energy is tried to be learned by machine learning such as NNP, the value of this adsorption energy is small relative to a prediction error of the energy of the whole system. Accordingly, in error backpropagation, it is sometimes difficult to distinguish the adsorption energy from the error, and thus to execute learning regarding this adsorption energy.

DETAILED DESCRIPTION

Figure 1:
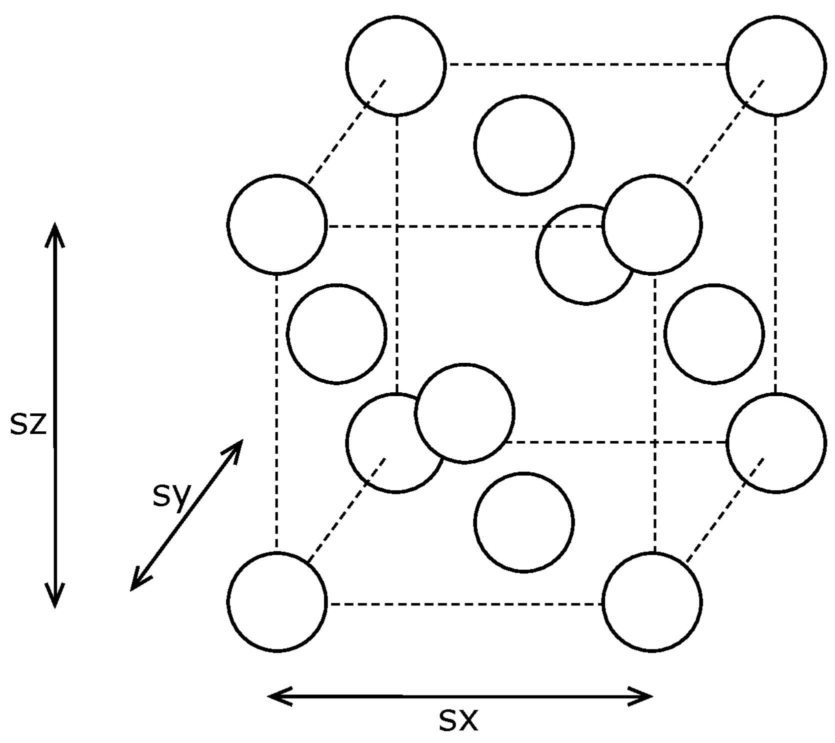
FIG. 1 is a view illustrating an example of a unit cell representing an atomic structure.

According to one embodiment, a training device includes one or more memories and one or more processors. The one or more processors are configured to input a first atomic structure including a surface and an adsorbed molecule close to the surface into a training target model to obtain an energy which is outputted from the training target model in response to the input, and obtain a first error based on the outputted energy of the first atomic structure and a ground truth value of the energy of the first atomic structure, input a fourth atomic structure including a cluster and an adsorbed molecule close to the cluster into the training target model to obtain an energy which is outputted from the training target model in response to the input, and obtain a fourth error based on the outputted energy of the fourth atomic structure and a ground truth value of the energy of the fourth atomic structure, and update a parameter of the training target model based on the first error and the fourth error. The surface and the cluster include the same atom.

Prerequisite knowledge and so on will be described before the description of embodiments.

Energy has an extensive property, and for example, the energy of two $H_2O$ molecules is twice as high as the energy of one $H_2O$ molecule. Further, energy is roughly proportional to the number of atoms. As the whole system has a lower energy, it has a stabler state, and in principle, atoms move such that the energy becomes lower. Therefore, a higher-energy state is more difficult to occur than a low-energy state.

Coordinate differentiation of energy gives force. Therefore, if energy is found, it is possible to obtain force acting on each atom.

From the above, it follows that if an atomic structure is defined and the energy of this atomic structure can be found, it is possible to obtain force on each atom, and by adjusting the positions of the atoms based on the forces, it is possible to obtain an atomic structure in a stable state (or metastable state).

An interatomic potential (potential energy of interatomic interaction) is a function for obtaining energy from the arrangement of atoms and is also called a force field. This function is typically an artificial function. It is a function corresponding to a governing equation used in Molecular Dynamics (MD) simulation. Combining it with a computational science approach enables the calculation of various physical properties. In the case where the number of atoms is N, it is possible to obtain an energy value from an atomic structure designated by N pieces of three-dimensional coordinates and three pieces of element information. Differentiating this energy by the three-dimensional coordinates can give forces acting on the atoms as N pieces of three-dimensional coordinates.

Neural Network Potential (NNP) is an interatomic potential approximately represented by a neural network model. The neural network model may be a graph neural network or a graph convolutional neural network capable of handling graph information, but is not limited to either of these. The aforesaid function for obtaining the energy from the atomic structure is formed by machine learning, resulting in a regression problem. Backpropagating the energy after forward propagating the atomic structure to this neural network model of NNP makes it possible to obtain force on each atom.

Density Functional Theory (DFT) is one method to obtain, from the arrangement of atoms (atomic structure), an electronic state represented by a wave function $\psi(x)$. It is also possible to obtain energy (or force) from the electronic state. By conducting calculation based on DFT (also referred to as DFT calculation or calculation using a density functional theory), it is possible to convert the N pieces of three-dimensional coordinates and the N pieces of element information to the electronic state and obtain the energy or force from this electronic state. This is used for the creation of the interatomic potential, but its calculation cost is high. If the calculation cost is neglected, it is possible to use this DFT instead of the interatomic potential. Therefore, by DFT calculation, it is possible to generate teacher data of the neural network model of NNP.

Adsorption energy means an energy change caused by the adsorption of a molecule or the like onto a solid surface and is an amount corresponding to the magnitude of an interaction between the solid surface and the molecule or the like. In this disclosure, adsorption energy $\Delta E_{adsorp}$ is represented by the following equation, where E(molecule) is the energy of a molecule, E(slab) is the energy of a surface, and E(molecule+slab) is the energy of the molecule and the surface.

$$\Delta E_{adsorp}=E(\text{molecule})+E(\text{slab})-E(\text{molecule+slab}) \qquad \text{(eq. 1)}$$

Adsorption energy is represented as a negative value in some papers, and in some others, represented as an absolute value. In this disclosure, adsorption energy is defined by equation (1), and in principle, the adsorption energy takes a positive value. In the case where adsorption energy takes a negative value, an adsorption state is considered to be stabler, and therefore, after an atomic structure is optimized, it may be reflected in training or re-inference may be executed.

An atomic structure used in DFT, for example, an atomic structure that is to be input to NNP is sometimes described using a periodic boundary condition. For example, the structure of a crystal is described using a periodic boundary condition added to an atomic structure of a unit cell which is a repetition unit.

FIG. 1 is a view schematically illustrating a unit cell of Pt (platinum) by way of example. The cube indicated by the dotted lines represents a region of the unit cell, and the spheres indicated by the solid lines represent Pt atoms. Pt has the structure of a face-centered cubic lattice and thus has the arrangement illustrated in FIG. 1 in a stable structure. Note that in the drawing, the regions representing the atoms partly project out of the cell region, but this does not affect computation because, in actual practice, it is only necessary to show the positions of the Pt atoms.

sx, sy, and sz indicate the lengths of the axes of the unit cell. In the state in FIG. 1, sx, sy, and sz match the size of the unit lattice of Pt, but this is not restrictive, and as will be described later, they are appropriately defined so that DFT computation and the inference through the DFT computation by NNP are executed while various states are defined.

Figure 2:
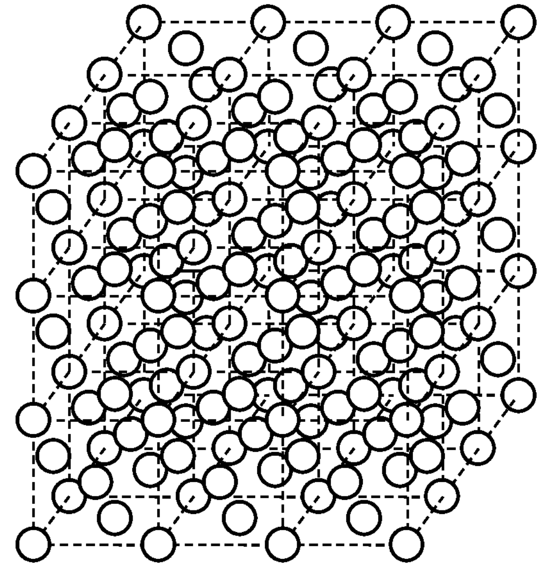
FIG. 2 is a view illustrating an example of the representation of an atomic structure.

FIG. 2 illustrates an atomic structure of, for example, a 3×3×3 combination of the unit cells in FIG. 1. In this drawing, the unit cells are arranged according to a periodic boundary condition, and some of their Pt atoms are extracted.

The size and shape of a unit cell can be represented by the lengths of its axes and the angles between the axes. The lengths of the axes of the unit cell in FIG. 1 are represented by (sx, sy, sz) and a three-dimensional quantity. Similarly, since the unit cell in FIG. 1 is a cubic crystal, the angles made by its axes are represented by (π/2, π/2, π/2) and a three-dimensional quantity. According to a crystal structure to be represented, the lengths of the axes of the unit cell and the angles made by the axes are decided.

If a periodic boundary condition is used, an atomic structure is described using n×(coordinates (three dimensional), element (one dimensional)) and (angle (three dimensional), length (three dimensional)) describing the periodic boundary condition in the case where atoms included in the atomic structure is N. Designating the periodic boundary condition makes it possible to define, for example, an atomic structure in which the unit cell in FIG. 1 is repeated an infinite number of times.

On the other hand, using a free boundary condition, a state with no repetition can be described. For describing an atomic structure regarding a later-described cluster, this free boundary condition may be set, or a periodic boundary condition defining a unit cell whose size is large enough to enable the cancellation of an influence of other molecules or the like may be set to reduce the complexity of computation in NNP. In this disclosure, in principle, training and inference are conducted with the periodic boundary condition being set, but as described above, the boundary condition is not limited to this and any boundary condition may be set as long as each state can be appropriately described.

Figure 3:
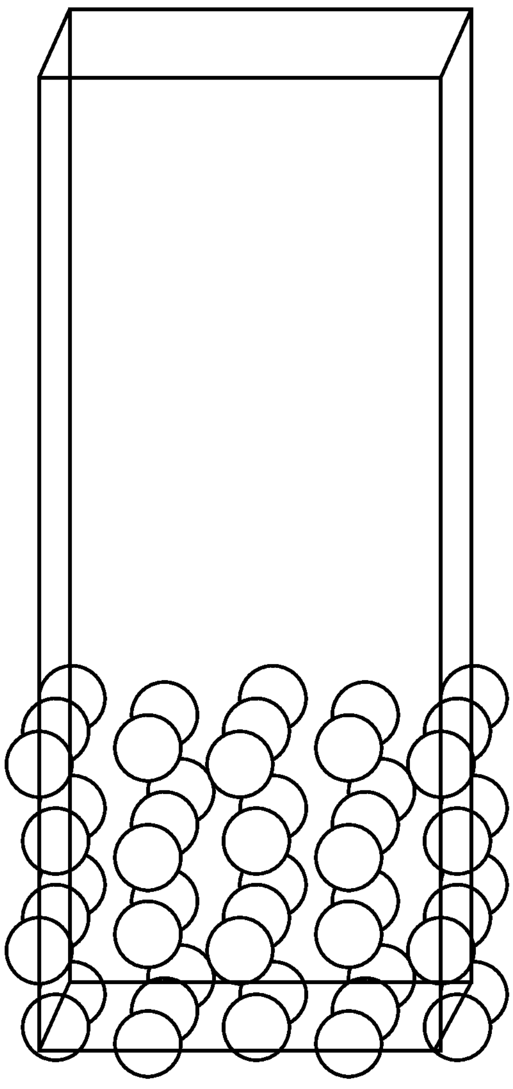
FIGS. 3 and 4 are views illustrating examples of the representation of a surface by an atomic structure.

FIG. 3 is a view illustrating one method (slab model) for representing a surface using a periodic boundary condition. For example, as a unit cell, the aforesaid structure formed by the assembly of the unit lattices is set on the lower side, and a region thereabove is a vacuum. This setting makes it possible to generate a model capable of appropriately representing the surface shape of a metal, a crystal, or the like.

Figure 4:
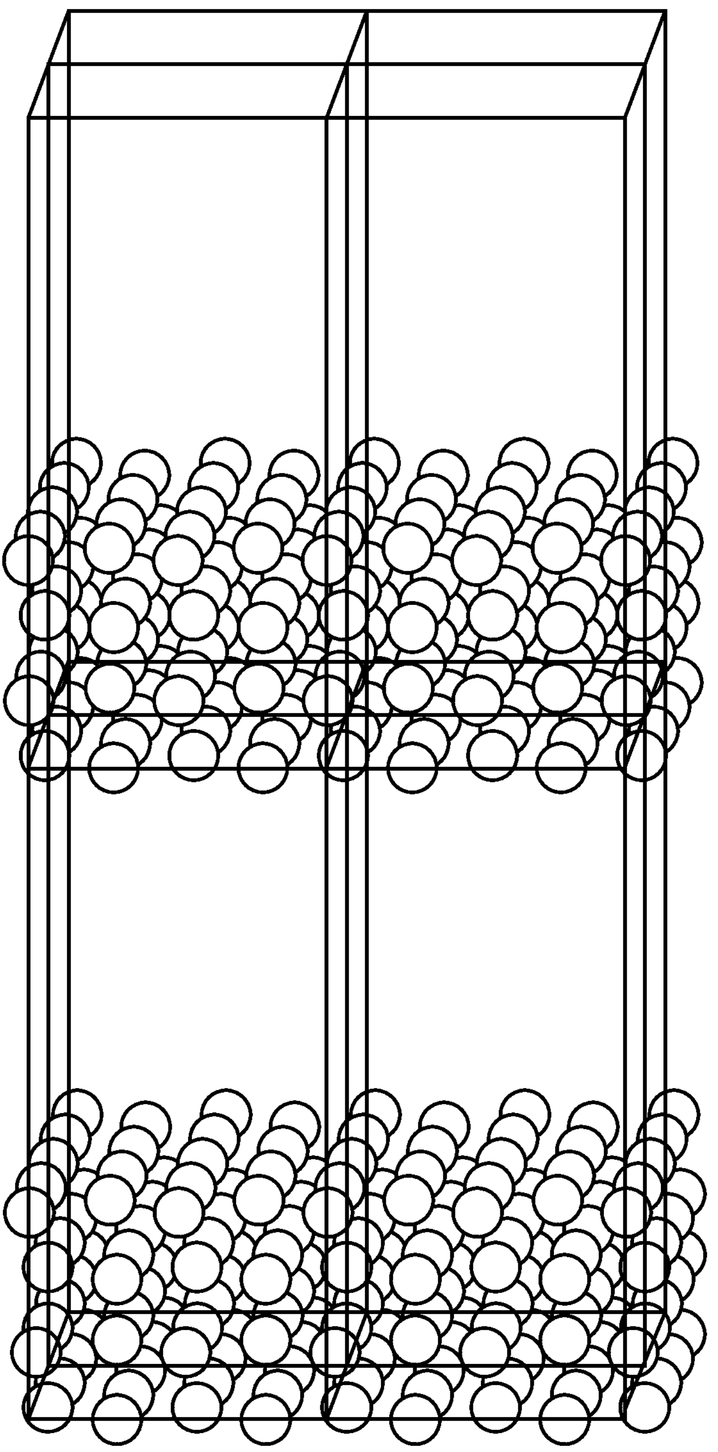

FIG. 4 is a view illustrating an atomic structure which is a 2×2 repetition of the structure in FIG. 3. As illustrated in FIG. 4, by describing the structure in FIG. 3 using the periodic boundary condition, it is possible to represent an atomic structure in which substances having surfaces and vacuum layers are alternately repeated. By setting the thickness of the vacuum layers sufficiently large (for example 15 Å~), it is possible to describe an atomic structure in which a molecule arranged close to (for example, apart by 5 Å or less from) the surface is not affected by the other surface structure.

Embodiments in this disclosure will be described with reference to the drawings, using the expressions and so on above. The drawings and the description of the embodiments are presented by way of example and are not intended to limit the present invention.

(Inferring Device)

Figure 5:
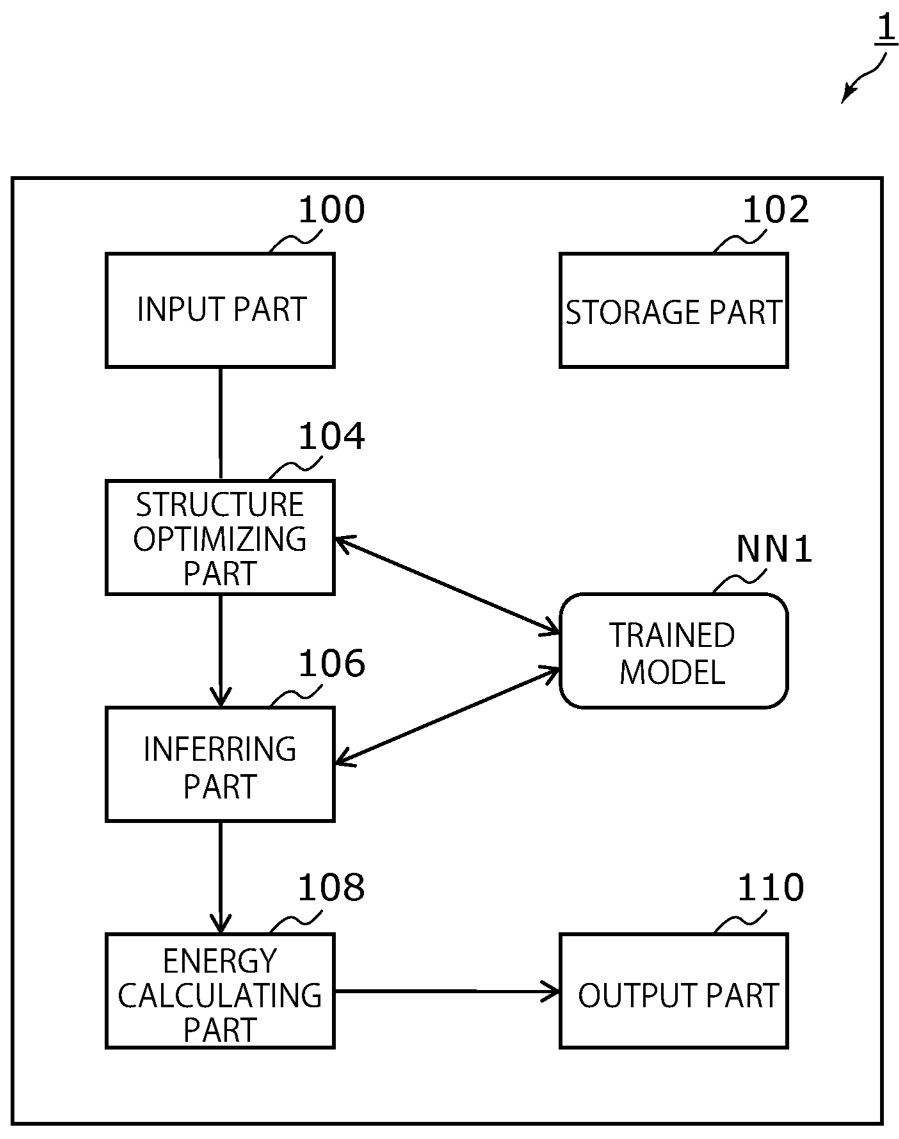
FIG. 5 is a diagram schematically illustrating an inferring device according to an embodiment.

FIG. 5 is a block diagram schematically illustrating an inferring device 1 according to an embodiment. The inferring device 1 includes an input part 100, a storage part 102, a structure optimizing part 104, an inferring part 106, an energy calculating part 108, and an output part 110. The inferring device 1 infers, for example, adsorption energy using a trained model NN1.

The trained model NN1 is the aforesaid neural network model used for NNP, and is configured to output energy when an atomic structure is input thereto. As described above, the input is, for example, data of the number of atoms included in the atomic structure×(element (1 dimensional)+coordinates (3 dimensional))+periodic boundary condition (angle (3 dimensional)+length (3 dimensional)). For example, this trained model NN1 may be one type of a graph neural network model capable of processing a graph or may be any other desired neural network model. Note that the trained model NN1 may be a model that executes the inference while a boundary condition is fixed to a periodic boundary condition.

By way of example, the trained model NN1 is a model formed as a neural network model that obtains a physical property value from an atomic structure through quantum chemical calculation. This trained model NN1 may be a model that outputs the result of first principle calculation which is conducted as the quantum chemical calculation. Further, this trained model NN1 may be a model that obtains the result of DFT calculation which is conducted as the first principles calculation. Note that in this embodiment, it will be described that the first principles calculation is executed using the DFT calculation, but besides, the first principles calculation may be calculation using a Hartree-Fock method, a Møller-Plesset method, or the like. In this case, the trained model NN1 may be a model forming NNP that outputs potential energy when an atomic structure is input thereto. In the following, the description will be given assuming that the trained model NN1 is a model that infers energy from the atomic structure through DFT calculation.

The input part 100 includes an interface that accepts the input of data and so on that the inferring device 1 requires for inferring adsorption energy. Through the input part 100, the inferring device 1 receives, for example, data regarding a surface structure and an atomic structure of an adsorbed molecule of a metal, a crystal, or the like whose adsorption energy is to be obtained. The atomic structure is described in the same manner as above. To the inferring device 1, data of the surface structure and data of the molecular structure may be input, or data of the surface structure, data of the molecular structure, and data containing the surface structure and the molecular structure may be input.

The storage part 102 stores data necessary for the operation of the inferring device 1. For example, data input to the inferring device 1 through the input part 100 may be stored in this storage part 102. In FIG. 5, the storage part 102 is included in the inferring device 1, but at least part of the storage part 102 may be implemented in an external storage, file server, or the like. In this case, the system may be configured such that at the time when data or the like becomes necessary, the data is input thereto through the input part 100.

Hereinafter, an atomic structure including both an atomic structure regarding an adsorbed molecule and an atomic structure regarding a surface will be referred to as a first atomic structure, an atomic structure regarding the adsorbed molecule as a second atomic structure, and an atomic structure regarding the surface as a third atomic structure.

The structure optimizing part 104 optimizes the first atomic structure, that is, an appropriate atomic structure in which the molecule is adsorbed on the surface structure, based on data of the input surface structure and molecular structure. For example, in the case where data of the first atomic structure in which the surface structure and the molecular structure coexist is input as the input data, the data of this atomic structure is optimized, and as a result, data of the atomic structure in a state in which the molecule is adsorbed on the surface, that is, in a stable state is obtained.

In the case where the data regarding the atomic structure of the adsorbed molecule being the second atomic structure and the atomic structure of the surface being the third atomic structure are input to the inferring device 1 without the first atomic structure being input thereto, the first atomic structure is generated from the data regarding the second atomic structure and the third atomic structure and is optimized. In this case, the structure optimizing part 104 generates the data of the first atomic structure in which the adsorbed molecule is close to the surface, and optimizes this data of the first atomic structure. Here, "close" may refer to, for example, a state where the closest atoms of the adsorbed molecule and the surface are apart by a predetermined distance (for example, 5 Å) or less or may refer to a state where they are apart by a smaller distance.

The structure optimizing part 104 inputs the data regarding the first atomic structure to the trained model NN1 and obtains the potential energy, and thereafter backpropagates the obtained energy value to the trained model NN1, thereby obtaining forces applied on the atoms. The structure optimizing part 104 updates, as the first atomic structure, an atomic structure in which the adsorbed molecule has been moved based on the forces.

If necessary, the structure optimizing part 104 may repeatedly execute this updating of the first atomic structure. This updating may be repeated until an appropriate end condition is satisfied, for example, until the position of the adsorbed molecule no longer changes, until the positional change of the adsorbed molecule reaches a predetermined threshold value or less, until the force reaches a predetermined threshold value or less, or until a predetermined number of times of the updating is finished.

The first atomic structure updated to be optimized by the structure optimizing part 104 can be a stable or metastable atomic structure. Based on this first atomic structure, the inferring device infers the adsorption energy.

Note that in the case where data regarding the first atomic structure in which it is ensured that the adsorbed molecule is appropriately adsorbed on the surface, that is, its state is stable or metastable is input, the structure optimizing part 104 is not an essential structure.

The inferring part 106 infers the energies in the second atomic structure, the third atomic structure, and the optimized first atomic structure, using the trained model NN1. In equation (1), E(molecule) corresponds to an output obtained as a result of inputting the second atomic structure to the trained model NN1, E(slab) corresponds to an output obtained as a result of inputting the third atomic structure to the trained model NN1, and E(molecule+slab) corresponds to an output obtained as a result of inputting the first atomic structure to the trained model NN1. The inferring part 106 inputs the first atomic structure, the second atomic structure, and the third atomic structure to the trained model NN1 to obtain the energies of these.

The energy calculating part 108 calculates the adsorption energy using equation (1) based on the energy values obtained by the inferring part 106. To unify conditions in the calculation process, the energy calculating part 108 desirably uses the trained model NN1 for obtaining the energies of the first atomic structure, the second atomic structure, and the third atomic structure.

On the other hand, as for the second atomic structure and the third atomic structure, in the case where the values of the energies stored in a database or the like are highly reliable, the values in the database or the like can be used for the computation. In this case, the inferring part 106 only needs to infer the energy of at least the first atomic structure.

The output part 110 outputs the adsorption energy found by the energy calculating part 108 appropriately to an external part or the storage part 102.

Figure 6:
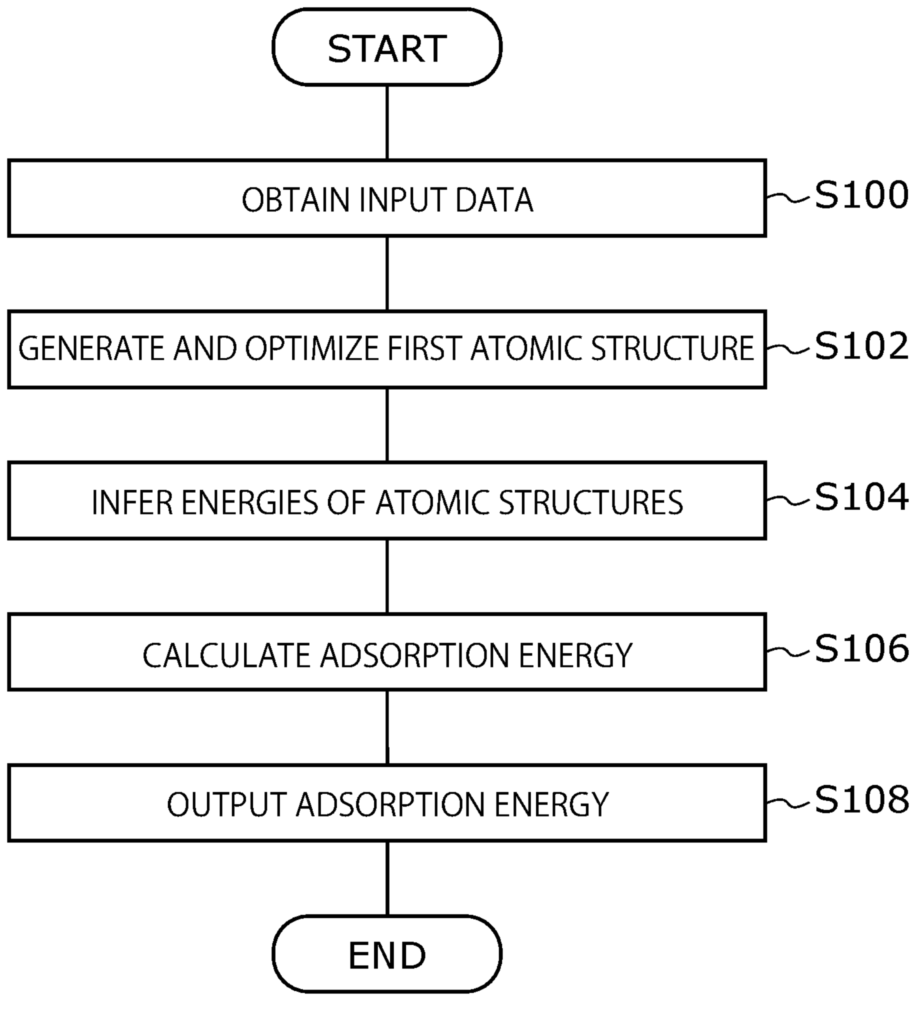
FIG. 6 is a flowchart illustrating a process of the inferring device according to the embodiment.

FIG. 6 is a flowchart illustrating an example of the process of the inferring device 1.

The inferring device 1 obtains, through the input part 100, input data of atomic structures regarding a molecule or the like and a surface or the like, whose adsorption energy is desired to be obtained (S100). As described above, through the input part 100, the inferring device 1 may obtain data regarding the second atomic structure and the third atomic structure or may obtain data regarding the first atomic structure in addition to these. Further, these atomic structures may be input in a graph form, except for the periodic boundary condition.

The structure optimizing part 104 optimizes the first atomic structure based on the input second atomic structure and third atomic structure (S102). More specifically, it defines the first atomic structure in which the molecule or the like described by the second atomic structure is close to the surface or the like described by the third atomic structure, and optimizes this defined first atomic structure using the trained model NN1. Note that in the case where the first atomic structure has been obtained in S100, this first atomic structure may be optimized using the trained model NN1. Further, in the case where the first atomic structure for which the stable state is ensured is input, the processing in S102 is omittable.

The inferring part 106 inputs the updated first atomic structure, the second atomic structure, and the third atomic structure to the trained model NN1, and obtains inference values of E(molecule+slab), E(molecule), and E(slab) (S104).

From the energies obtained in S104 regarding the respective structures, the energy calculating part 108 obtains the adsorption energy based on (eq. 1) (S106).

The inferring device 1 outputs the adsorption energy from the output part 110 and ends the process (S108).

In the case where the database or the like is referred to for the energies of the second atomic structure and the third atomic structure, the inferring part 106 infers the energy of at least the first atomic structure in S104. Then, in S106, the energy calculating part 108 may calculate the adsorption energy using the energy of the first atomic structure obtained by the inferring part 106 and the energies of the second atomic structure and the third atomic structure for which the database or the like is referred to.

(Training Device)

The following describes a training device for training the trained model NN1 used in the inference of the energies in the above-described inferring device 1.

Figure 7:
FIG. 7 is a diagram schematically illustrating a training device according to an embodiment.
Figure 7:
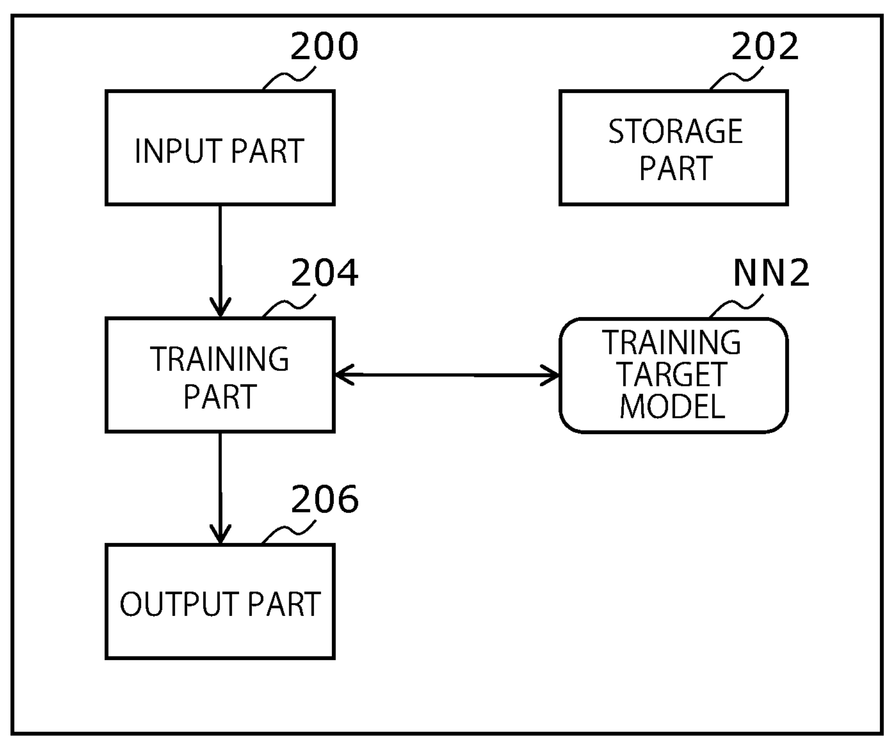

FIG. 7 is a block diagram schematically illustrating the training device according to one embodiment. The training device 2 includes an input part 200, a storage part 202, a training part 204, and an output part 206. The training device 2 is a device for training the trained model NN1 used in the above-described inferring device 1 and trains a training target model NN2 using a machine learning method.

The training target model NN2 is a neural network model used for NNP. Its basic configuration is the same as that of the above-described trained model NN1, and thus details thereof will be omitted.

The input part 200 accepts an input of data in the training device 2. The training device 2 obtains, through the input part 200, data and so on necessary for the training.

The storage part 202 stores data and so on necessary for the operation of the training device 2. The data input through the input part 200 may be stored in this storage part 202.

The training part 204 executes the training of the training target model NN2. The training target model NN2 is trained mainly as a model that infers the energy, including the adsorption energy, of the whole atomic structure when the first atomic structure is input thereto.

The output part 206 outputs a parameter and so on of the training target model NN2 trained by the training part 204, to the external part or the storage part 202.

The training part 204, when an atomic structure is input thereto as described above, trains the training target model NN2 so that the training target model NN2 infers, regarding this atomic structure, the result of quantum chemical calculation, for example, first principles calculation, in particular, DFT calculation. The training part 204 optimizes the parameter of the training target model NN2 by, for example, supervised learning.

If the DFT calculation (quantum chemical calculation, first principles calculation) is used regarding the molecular atomic structure and the surface atomic structure, a value of the adsorption energy becomes on the same level as an error used in backpropagation in the training or smaller than the error, leading to a low possibility of the appropriate training by machine learning. In this embodiment, with the aim to appropriately incorporate this adsorption energy into learning, an atomic structure of a cluster composed of atoms whose number is several to several tens smaller than the number of atoms forming the atomic structure of the surface is used as training data. Note that the cluster may be an energy-stable part that is cut out from the atomic structure of the surface.

Data that this training part 204 uses for the training will be described. The data may be generated by a data generating device or may be obtained from a database or the like. In the case where the data is generated by the data generating device, the DFT calculation is executed regarding the atomic structure to calculate the energy, and the combination of these atomic structure and energy is used as a data set. Further, force may be calculated in the data generating device and this may be used as teacher data. In the below, the case where the energy is used will be described, but the same applies to the case where force is used unless otherwise specified.

Figure 8:
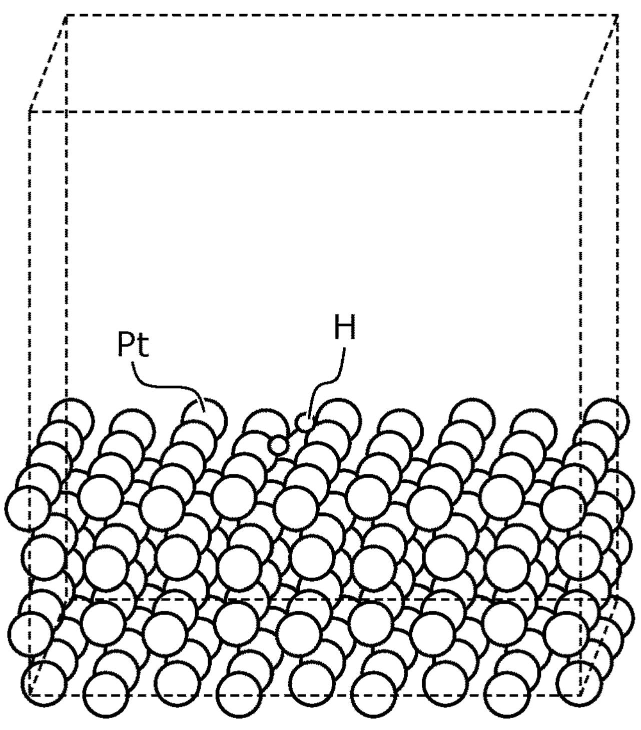
FIG. 8 is a view illustrating an example of atomic structures of a molecule and a surface.

FIG. 8 is a view illustrating one type of data used in the training in this embodiment. The dotted lines represent a unit cell. FIG. 8 illustrates a state where an $H_2$ molecule is adsorbed on (close to) the surface of Pt. The large spheres represent Pt atoms and the small spheres represent H atoms. First, a first atomic structure which is a thus represented atomic structure of the $H_2$ molecule and the Pt surface is defined.

For example, an atomic structure in which a molecular structure is added to the surface structure in the unit cell illustrated in FIG. 2 is defined as the first atomic structure. The shortest distance between the H atoms of the $H_2$ molecule and the Pt molecule may be not less than 4 Å nor more than 5 Å, for instance. As described above, the size of the unit cell is desirably sufficiently large. For example, the Pt atoms may be further increased in the surface direction while the arrangement of the $H_2$ atoms is left unchanged.

Regarding this first atomic structure, an energy value is found through DFT calculation. This first atomic structure may be one not optimized to the stable state. Preferably, a data set regarding the first atomic structure optimized to the stable state or the metastable state is prepared. More preferably, data sets regarding first atomic structures with the $H_2$ position and posture to the Pt surface being variously varied are prepared.

Further, by preparing data not only regarding the combination of Pt and H but also regarding various combinations, it is possible to enhance inference accuracy (for example, accuracy in interpolation state). Further, the number of kinds of elements of the molecule and the number of kinds of elements on the surface need not be one, and it is desirable to prepare data sets also regarding a molecule composed of a plurality of kinds of elements and a surface composed of a plurality of kinds of elements.

Figure 9:
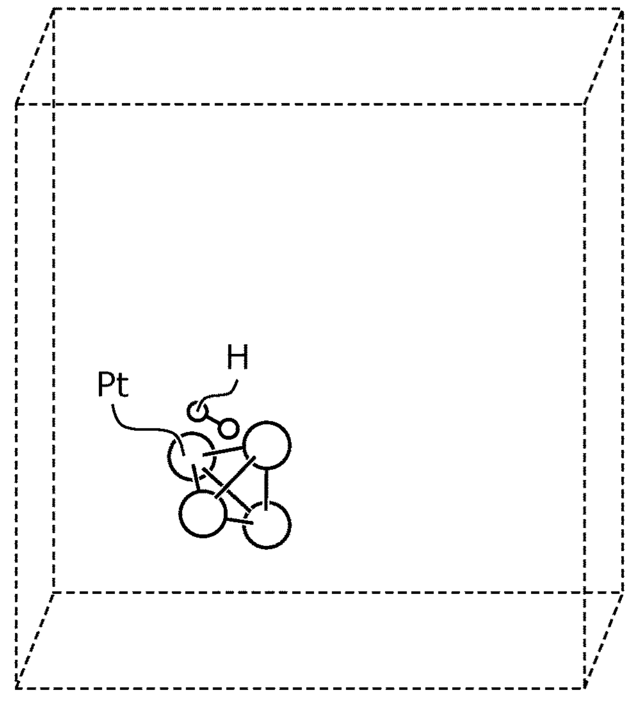
FIGS. 9 and 10 are views each illustrating atomic structures of a molecule and a cluster.

FIG. 9 is a view illustrating a different type of data used in the training in this embodiment. FIG. 9 illustrates a cluster and a molecule which are close to each other. Then, regarding a fourth atomic structure which is an atomic structure composed of these $H_2$ molecule and Pt cluster, DFT calculation is executed to obtain an energy value. As in the case of the surface, the shortest distance between the H atoms of the $H_2$ molecule and the Pt molecule of the Pt surface may be 5 Å or less, for instance.

A data set of the fourth atomic structure and the energy value is used as training data. In this drawing, regarding a unit cell including four Pt atoms and one $H_2$ molecule, DFT calculation is executed using a periodic boundary condition. Note that the DFT calculation may be executed using a free boundary condition, but in the case where the input of the training target model NN2 used for NNP is fixed to the periodic boundary condition, the calculation is desirably executed using the periodic boundary condition.

In the case of FIG. 9, as in the case of FIG. 8, it is preferable to prepare data sets with the position and posture of the molecule relative to the cluster being variously varied. Further, it is preferable to prepare a data set also for the adsorption state.

This is also the same with the combination of elements, and preparing a data set not only regarding the combination of the Pt atoms and the H atoms but also regarding a variety of combinations enables an improvement in interpolation performance.

Figure 10:
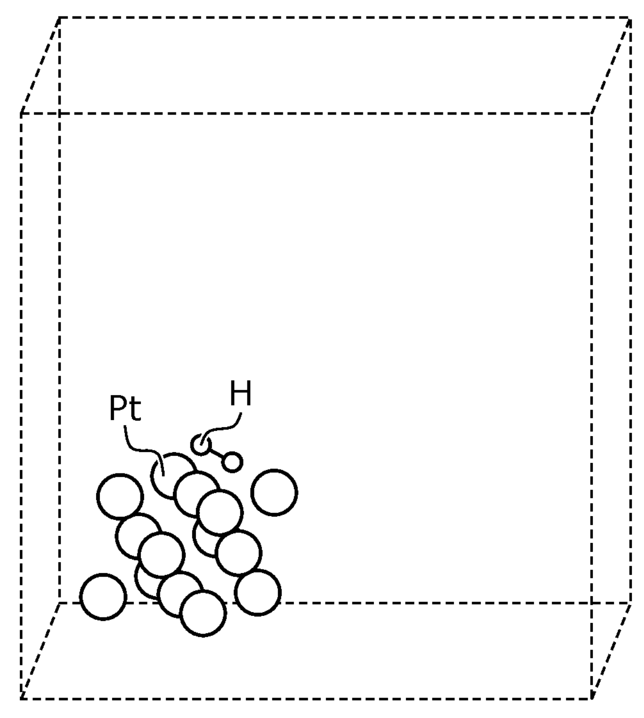

FIG. 10 illustrates a different example of a combination of a cluster and a molecule. As illustrated in this example, for example, one in which an $H_2$ molecule is close to 14 pieces of Pt in a cutout face-centered cubic structure may be defined. Regarding the fourth atomic structure, data sets with the number of atoms forming the cluster and the arrangement of the atoms forming the cluster being thus variously changed are desirably prepared.

As is understood from the above, the first atomic structure is an atomic structure in which an adsorbed molecule (for example, an $H_2$ molecule) is close to a solid surface (for example, a Pt solid surface) ("close" includes an adsorbed state or a state that can be regarded as the adsorbed state), and the fourth atomic structure is an atomic structure in which an adsorbed molecule is close to a cluster (for example, a Pt cluster) ("close" includes an adsorbed state or a state that can be regarded as the adsorbed state). The solid surface of the first atomic structure and the cluster of the fourth atomic structure include the same atoms (for example, the Pt atoms).

The training part 204 calculates a first error which is a difference between a result obtained when the first atomic structure is input to the training target model NN2 and a result obtained by the DFT calculation. The training part 204 backpropagates this first error to update the parameter of the training target model NN2. In parallel, the training part 204 calculates a fourth error which is a difference between a result obtained when the fourth atomic structure is input to the training target model NN2 and a result obtained by the DFT calculation. The training part 204 backpropagates this fourth error to update the parameter of the training target model NN2.

The use of the training data set regarding the first atomic structure and the training data set regarding the fourth atomic structure as the training data without distinction makes it possible to train a neural network model that achieves the inference regarding the first atomic structure and the fourth atomic structure.

The magnitude of an interaction between the molecule and the surface in the first atomic structure and the magnitude of an interaction between the molecule and the cluster calculated from the fourth atomic structure are not much different because their local structures are the same. The first atomic structure and the fourth atomic structure greatly differ in the magnitude of the interaction per atom because they greatly differ in the number of atoms. The neural network model learns this interaction from the energy, and since the magnitude of the interaction per atom is large, learning using the result of the fourth atomic structure makes it possible to prevent the adsorption energy from being buried in an error used for the training.

In this embodiment, the training device 2 trains the training target model NN2 using the data sets regarding the plurality of first atomic structures and data sets regarding the plurality of fourth atomic structures. In such training, the acquisition of the energy values regarding the surface and the molecule is appropriately learned and the data of the cluster and the molecule are used as the training data, achieving more accurate reproduction of the adsorption energy.

To more accurately execute the training regarding the energy per atom, the first error and the fourth error can be different from the above-described ones. For example, the training part 204 may divide the difference between the result obtained when the first atomic structure is input to the training target model NN2 and the result of the DFT calculation by the number of atoms included in this atomic structure and use the resultant value as the first error. Similarly, the training part 204 may divide the difference between the result obtained when the fourth atomic structure is input to the training target model NN2 and the result of the DFT calculation by the number of atoms included in this atomic structure and use the resultant value as the fourth error.

By backpropagating the error from the energy per atom, as for the surface, the training part 204 is able to infer the energy in which the influence of the surface is reflected, and as for the atoms of the surface or the cluster close to the molecule, is able to infer the energy in which the influence of the adsorption energy is reflected.

Further, to distinguish the error due to the influence of the number of atoms from the adsorption energy, the difference between the output of the training target model NN2 and the result of the DFT calculation may be divided by the square of the number of atoms included in the atomic structure.

Figure 11:
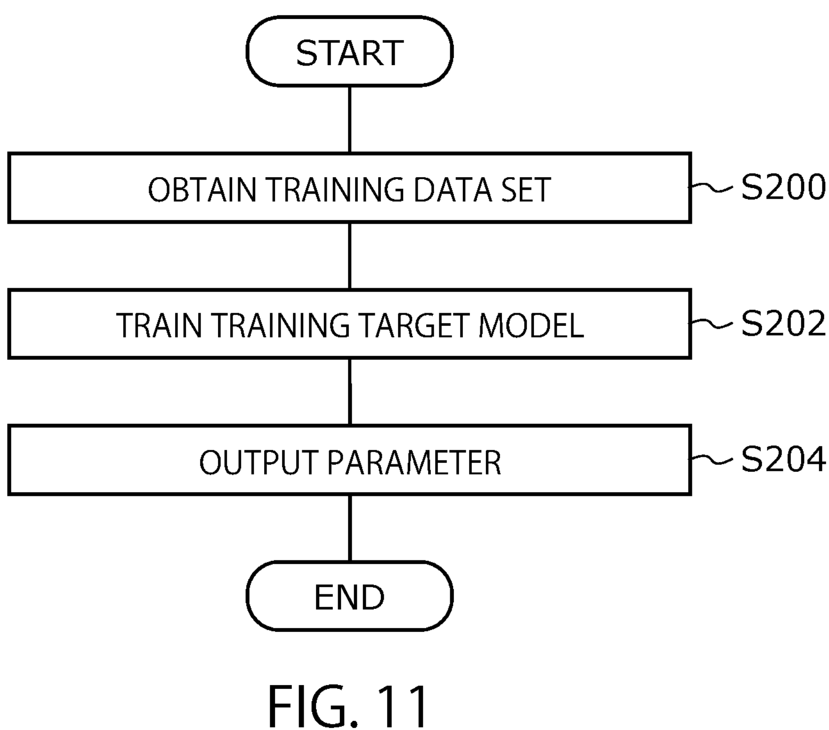
FIG. 11 is a flowchart illustrating a process of the training device according to the embodiment.

FIG. 11 is a flowchart illustrating a process of the training device 2 according to this embodiment.

First, the training device 2 obtains a training data set through the input part 200 (S200). As described above, the training data set includes the data set regarding the first atomic structure and the data set regarding the fourth atomic structure.

The training part 204 trains the training target model NN2 using the obtained training data set based on an appropriate desired machine learning method (S202).

The training device 2 outputs necessary data such as a parameter regarding the training target model NN2 whose training has been completed and ends the process (S204).

As described hitherto, according to this embodiment, the training device is able to execute the training of the training target model NN2 with the adsorption energy being appropriately reflected. Then, by executing NNP calculation using the trained model NN1 whose training has been completed, the inferring device is able to to highly accurately infer the adsorption energy.

(Modification Example)

The use of the trained model NN1 that has been trained as above makes it possible to infer the adsorption energy highly accurately, and in addition, it is possible to improve this accuracy.

The training device 2 can use a data set regarding the second atomic structure regarding only the adsorbed molecule besides the data sets regarding the first atomic structure and the fourth atomic structure.

Figure 12:
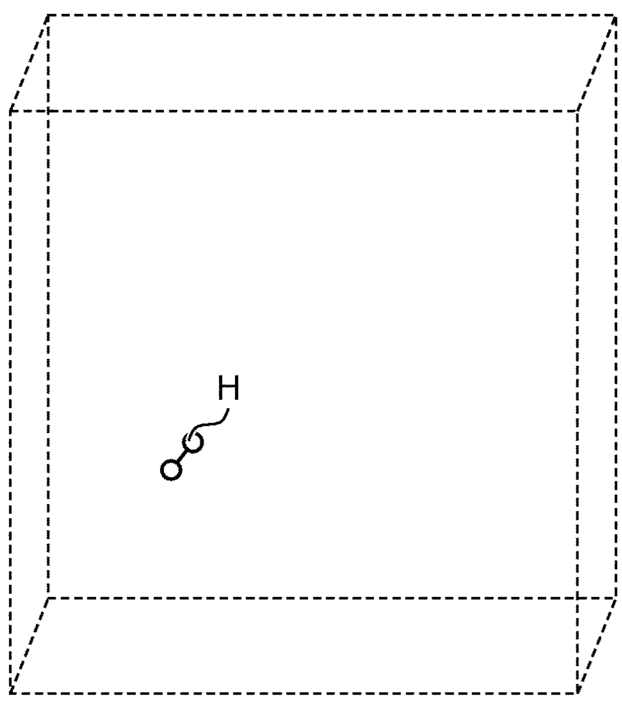
FIG. 12 is a view illustrating an atomic structure of a molecule.

FIG. 12 is a view illustrating an example of an atomic structure having only a molecule. The atomic structure with only the molecule thus set in a unit cell is defined as the second atomic structure. Then, the energy of this second atomic structure is found through DFT calculation and is added to a data set.

The training part 204 calculates a second error in the above-described manner using the data set of the second atomic structure and the result of the DFT calculation, and executes the training of the training target model NN2 based on this second error. The training is desirably executed without any distinction of this data set regarding the second atomic structure from the data set regarding the first atomic structure and the data set regarding the fourth atomic structure.

By thus executing the training based on the second atomic structure, it is possible to more accurately obtain the energy value regarding the second atomic structure composed of the molecule and improve the accuracy of the adsorption energy in the inference.

Further, because of the use of the data set regarding the second atomic structure in the training, it is expected that the molecular energy is taken into consideration besides the adsorption energy in the learning regarding the first atomic structure and the fourth atomic structure. Therefore, it is possible not only to improve the accuracy of E(molecule) but also to improve the accuracy of E(molecule+slab).

Specifically, by executing the training in which the second atomic structure is taken into consideration, it is possible to improve the inference of the energy of the first atomic structure as well as to improve the inference of the energy of the second atomic structure, and owing to these two aspects, it is possible to improve the accuracy of the adsorption energy.

In the above, the information on the molecule is obtained, but using data regarding the surface also makes it possible to improve the accuracy of the training. For example, the atomic structure illustrated in FIG. 2 may be defined as the third atomic structure regarding the surface, and a data set regarding this may be prepared. The preparation of the data set is the same as above, and details thereof will be omitted.

Using the data set regarding this third atomic structure, the training part 204 may compare the result obtained when the third atomic structure is input to the training target model NN2 and the result of DFT calculation to calculate a third error, and may train the training target model NN2 based on the third error in addition to the first error and the fourth error.

Such training makes it possible to improve the accuracy of the inference of the energy value on the surface (a simple substance of a metal, a crystal, or the like).

Figure 13:
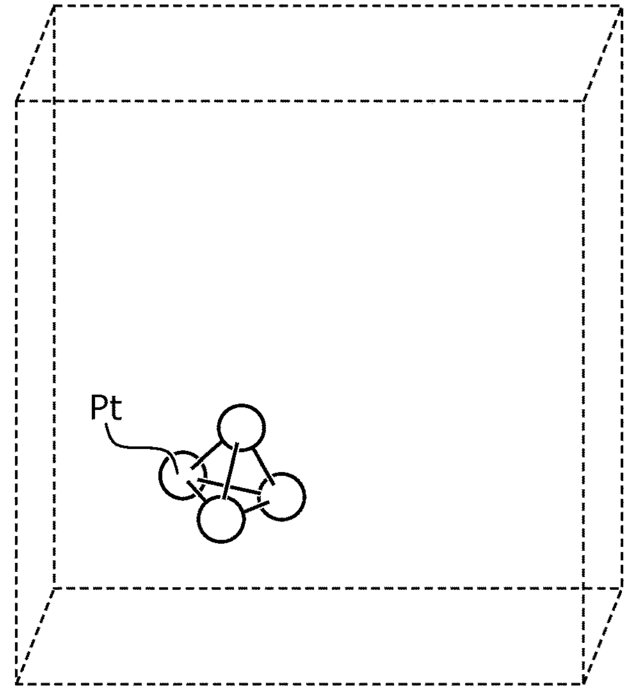
FIG. 13 is a view illustrating an atomic structure of a cluster.

FIG. 13 is a view illustrating an example of an atomic structure of a cluster. The training part 204 may execute training based on a fifth atomic structure which is the atomic structure of the cluster, in addition to the first atomic structure and the fourth atomic structure. Accordingly, a data set regarding the fifth atomic structure may be prepared.

Using the data set regarding the fifth atomic structure, the training part 204 may compare the result obtained when the fifth atomic structure is input to the training target model NN2 and the result of DFT calculation, to calculate a fifth error and may train the training target model NN2 based on the fifth error in addition to the first error and the fourth error.

Such training makes it possible to improve the accuracy of the inference of the energy value of the cluster, and as a result, makes it possible to improve the accuracy of the adsorption energy regarding the fourth atomic structure in the training.

The training device 2 executes the training based on the data sets regarding at least the first atomic structure and the fourth atomic structure, but may execute the training using the data set regarding at least one of the aforesaid second atomic structure, third atomic structure, and fifth atomic structure in addition to the data sets regarding the first atomic structure and the fourth atomic structure. The second atomic structure, the third atomic structure, or the fifth atomic structure can be incorporated in the training in any combination. Of course, the data sets regarding all of the first to fifth atomic structures may be prepared and the training device 2 may execute the training of the training target model NN2 using these data sets.

As a method to obtain the same effects as those in the above, data sets regarding an atomic structure in which the surface and the molecule are sufficiently distant and an atomic structure in which the cluster and the molecule are sufficiently distant may be used as training data sets together with the first atomic structure and the fourth atomic structure. “Sufficiently distant” may mean, for example, that the shortest distance of the atoms of the surface or the cluster from the atoms of the molecule is 10 Å or more. In this case, please note that the molecule is arranged to be sufficiently distant also from the opposite surface of the unit cell where the surface or the cluster is present.

By incorporating such data sets as the training data, the training device 2 is able to execute the training regarding the state of the surface and the molecule or the cluster and the molecule which are sufficiently distant from each other. In these cases, since there is no adsorption energy, it is possible to execute the training with clear distinction from the case where the surface and the molecule or the cluster and the molecule are arranged close enough to have the adsorption energy. Therefore, it is possible to form a trained model NN1 capable of accurate inference regarding the case where these situations are simply included in the atomic structure and regarding the stable situation owing to the adsorption energy.

The description has been given on the premise that the atomic structure of the surface described in this embodiment is the atomic structure of the solid surface, but “surface” is not limited to the solid surface. For example, the “surface” is a boundary where a homogeneous solid or liquid phase is in contact with another homogeneous gas phase or a vacuum and also conceptually includes a liquid surface such as a surface of a liquid metal generated through simulation of a high-temperature state. Then, the training target model may be trained using, as the first atomic structure, an atomic structure in which the surface of such a liquid metal and an adsorbed molecule are close to each other.

The trained models of above embodiments may be, for example, a concept that includes a model that has been trained as described and then distilled by a general method.

Some or all of each device (the inference device 1 or the training device 2) in the above embodiment may be configured in hardware, or information processing of software (program) executed by, for example, a CPU (Central Processing Unit), GPU (Graphics Processing Unit). In the case of the information processing of software, software that enables at least some of the functions of each device in the above embodiments may be stored in a non-volatile storage medium (non-volatile computer readable medium) such as CD-ROM (Compact Disc Read Only Memory) or USB (Universal Serial Bus) memory, and the information processing of software may be executed by loading the software into a computer. In addition, the software may also be downloaded through a communication network. Further, entire or a part of the software may be implemented in a circuit such as an ASIC (Application Specific Integrated Circuit) or FPGA (Field Programmable Gate Array), wherein the information processing of the software may be executed by hardware.

A storage medium to store the software may be a removable storage media such as an optical disk, or a fixed type storage medium such as a hard disk, or a memory. The storage medium may be provided inside the computer (a main storage device or an auxiliary storage device) or outside the computer.

Figure 14:
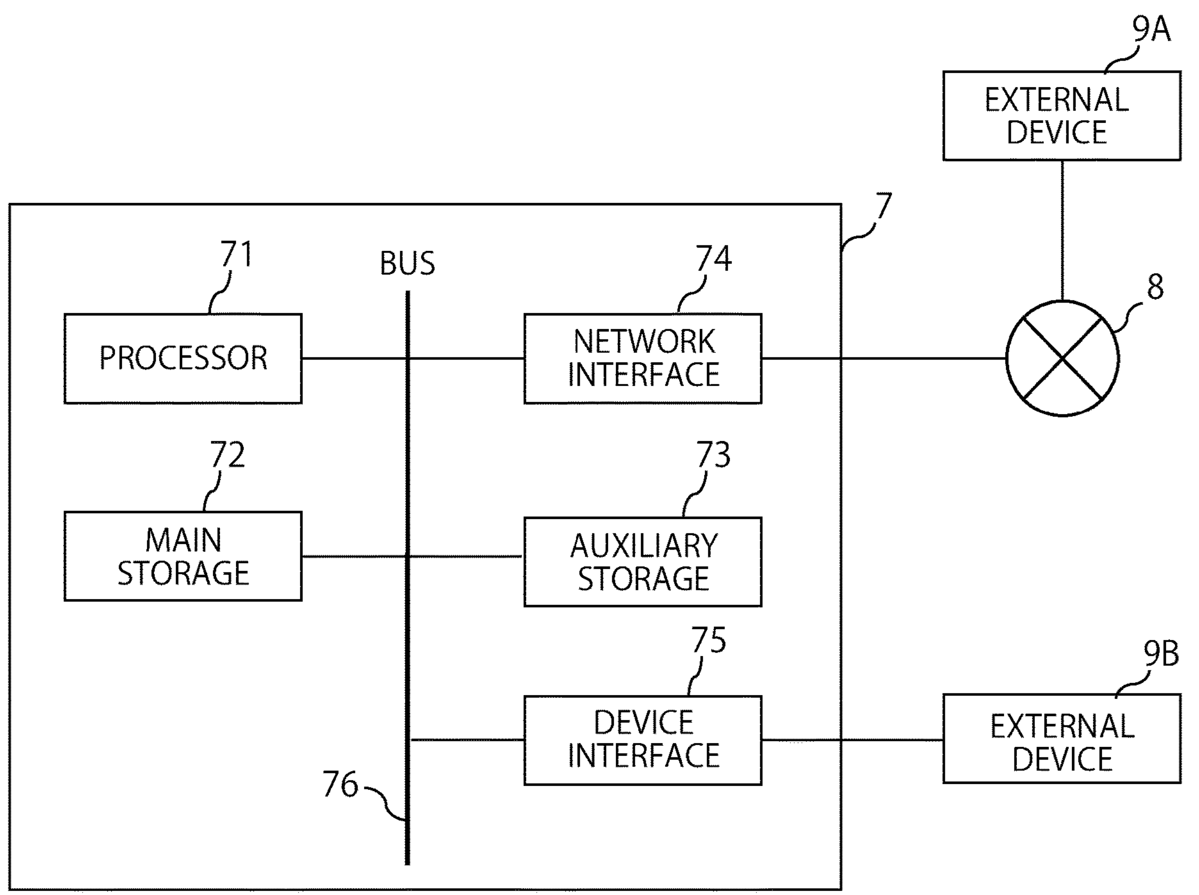
FIG. 14 is a diagram illustrating one example of an implementation of an information processing device according to an embodiment.

FIG. 14 is a block diagram illustrating an example of a hardware configuration of each device (the inference device 1 or the training device 2) in the above embodiments. As an example, each device may be implemented as a computer 7 provided with a processor 71, a main storage device 72, an auxiliary storage device 73, a network interface 74, and a device interface 75, which are connected via a bus 76.

The computer 7 of FIG. 14 is provided with each component one by one but may be provided with a plurality of the same components. Although one computer 7 is illustrated in FIG. 14, the software may be installed on a plurality of computers, and each of the plurality of computer may execute the same or a different part of the software processing. In this case, it may be in a form of distributed computing where each of the computers communicates with each of the computers through, for example, the network interface 74 to execute the processing. That is, each device (the inference device 1 or the training device 2) in the above embodiments may be configured as a system where one or more computers execute the instructions stored in one or more storages to enable functions. Each device may be configured such that the information transmitted from a terminal is processed by one or more computers provided on a cloud and results of the processing are transmitted to the terminal.

Various arithmetic operations of each device (the inference device 1 or the training device 2) in the above embodiments may be executed in parallel processing using one or more processors or using a plurality of computers over a network. The various arithmetic operations may be allocated to a plurality of arithmetic cores in the processor and executed in parallel processing. Some or all the processes, means, or the like of the present disclosure may be implemented by at least one of the processors or the storage devices provided on a cloud that can communicate with the computer 7 via a network. Thus, each device in the above embodiments may be in a form of parallel computing by one or more computers.

The processor 71 may be an electronic circuit (such as, for example, a processor, processing circuitry, processing circuitry, CPU, GPU, FPGA, or ASIC) that executes at least controlling the computer or arithmetic calculations. The processor 71 may also be, for example, a general-purpose processing circuit, a dedicated processing circuit designed to perform specific operations, or a semiconductor device which includes both the general-purpose processing circuit and the dedicated processing circuit. Further, the processor 71 may also include, for example, an optical circuit or an arithmetic function based on quantum computing.

The processor 71 may execute an arithmetic processing based on data and/or a software input from, for example, each device of the internal configuration of the computer 7, and may output an arithmetic result and a control signal, for example, to each device. The processor 71 may control each component of the computer 7 by executing, for example, an OS (Operating System), or an application of the computer 7.

Each device (the inference device 1 or the training device 2) in the above embodiments may be enabled by one or more processors 71. The processor 71 may refer to one or more electronic circuits located on one chip, or one or more electronic circuitries arranged on two or more chips or devices. In the case of a plurality of electronic circuitries are used, each electronic circuit may communicate by wired or wireless.

The main storage device 72 may store, for example, instructions to be executed by the processor 71 or various data, and the information stored in the main storage device 72 may be read out by the processor 71. The auxiliary storage device 73 is a storage device other than the main storage device 72. These storage devices shall mean any electronic component capable of storing electronic information and may be a semiconductor memory. The semiconductor memory may be either a volatile or non-volatile memory. The storage device for storing various data or the like in each device (the inference device 1 or the training device 2) in the above embodiments may be enabled by the main storage device 72 or the auxiliary storage device 73 or may be implemented by a built-in memory built into the processor 71. For example, the storages 102, 202 in the above embodiments may be implemented in the main storage device 72 or the auxiliary storage device 73.

In the case of each device (the inference device 1 or the training device 2) in the above embodiments is configured by at least one storage device (memory) and at least one of a plurality of processors connected/coupled to/with this at least one storage device, at least one of the plurality of processors may be connected to a single storage device. Or at least one of the plurality of storages may be connected to a single processor. Or each device may include a configuration where at least one of the plurality of processors is connected to at least one of the plurality of storage devices. Further, this configuration may be implemented by a storage device and a processor included in a plurality of computers. Moreover, each device may include a configuration where a storage device is integrated with a processor (for example, a cache memory including an L1 cache or an L2 cache).

The network interface 74 is an interface for connecting to a communication network 8 by wireless or wired. The network interface 74 may be an appropriate interface such as an interface compatible with existing communication standards. With the network interface 74, information may be exchanged with an external device 9A connected via the communication network 8. Note that the communication network 8 may be, for example, configured as WAN (Wide Area Network), LAN (Local Area Network), or PAN (Personal Area Network), or a combination of thereof, and may be such that information can be exchanged between the computer 7 and the external device 9A. The internet is an example of WAN, IEEE802.11 or Ethernet (registered trademark) is an example of LAN, and Bluetooth (registered trademark) or NFC (Near Field Communication) is an example of PAN.

The device interface 75 is an interface such as, for example, a USB that directly connects to the external device 9B.

The external device 9A is a device connected to the computer 7 via a network. The external device 9B is a device directly connected to the computer 7.

The external device 9A or the external device 9B may be, as an example, an input device. The input device is, for example, a device such as a camera, a microphone, a motion capture, at least one of various sensors, a keyboard, a mouse, or a touch panel, and gives the acquired information to the computer 7. Further, it may be a device including an input unit such as a personal computer, a tablet terminal, or a smartphone, which may have an input unit, a memory, and a processor.

The external device 9A or the external device 9B may be, as an example, an output device. The output device may be, for example, a display device such as, for example, an LCD (Liquid Crystal Display), or an organic EL (Electro Luminescence) panel, or a speaker which outputs audio. Moreover, it may be a device including an output unit such as, for example, a personal computer, a tablet terminal, or a smartphone, which may have an output unit, a memory, and a processor.

Further, the external device 9A or the external device 9B may be a storage device (memory). The external device 9A may be, for example, a network storage device, and the external device 9B may be, for example, an HDD storage.

Furthermore, the external device 9A or the external device 9B may be a device that has at least one function of the configuration element of each device (the inference device 1 or the training device 2) in the above embodiments. That is, the computer 7 may transmit a part of or all of processing results to the external device 9A or the external device 9B, or receive a part of or all of processing results from the external device 9A or the external device 9B.

In the present specification (including the claims), terms including ordinal numbers such as "first" or "second" can be used to describe variables components, however, the components are not limited by the terms. These terms are only used to distinguish one component from another. For example, a first component may be named as a second component, and similarly, a second component may also be named as a first component without departing from the conceptual idea and sprit of the present invention.

In the present specification (including the claims), the representation (including similar expressions) of "at least one of a, b, and c" or "at least one of a, b, or c" includes any combinations of a, b, c, a-b, a-c, b-c, and a-b-c. It also covers combinations with multiple instances of any element such as, for example, a-a, a-b-b, or a-a-b-b-c-c. It further covers, for example, adding another element d beyond a, b, and/or c, such that a-b-c-d.

In the present specification (including the claims), the expressions such as, for example, "data as input," "using data," "based on data," "according to data," or "in accordance with data" (including similar expressions) are used, unless otherwise specified, this includes cases where data itself is used, or the cases where data is processed in some ways (for example, noise added data, normalized data, feature quantities extracted from the data, or intermediate representation of the data) are used. When it is stated that some results can be obtained "by inputting data," "by using data," "based on data," "according to data," "in accordance with data" (including similar expressions), unless otherwise specified, this may include cases where the result is obtained based only on the data, and may also include cases where the result is obtained by being affected factors, conditions, and/or states, or the like by other data than the data. When it is stated that "output/outputting data" (including similar expressions), unless otherwise specified, this also includes cases where the data itself is used as output, or the cases where the data is processed in some ways (for example, the data added noise, the data normalized, feature quantity extracted from the data, or intermediate representation of the data) is used as the output.

In the present specification (including the claims), when the terms such as "connected (connection)" and "coupled (coupling)" are used, they are intended as non-limiting terms that include any of "direct connection/coupling," "indirect connection/coupling," "electrically connection/coupling," "communicatively connection/coupling," "operatively connection/coupling," "physically connection/coupling," or the like. The terms should be interpreted accordingly, depending on the context in which they are used, but any forms of connection/coupling that are not intentionally or naturally excluded should be construed as included in the terms and interpreted in a non-exclusive manner.

In the present specification (including the claims), when the expression such as "A configured to B," this may include that a physically structure of A has a configuration that can execute operation B, as well as a permanent or a temporary setting/configuration of element A is configured/set to actually execute operation B. For example, when the element A is a general-purpose processor, the processor may have a hardware configuration capable of executing the operation B and may be configured to actually execute the operation B by setting the permanent or the temporary program (instructions). Moreover, when the element A is a dedicated processor, a dedicated arithmetic circuit, or the like, a circuit structure of the processor or the like may be implemented to actually execute the operation B, irrespective of whether or not control instructions and data are actually attached thereto.

In the present specification (including the claims), when a term referring to inclusion or possession (for example, "comprising/including," "having," or the like) is used, it is intended as an open-ended term, including the case of inclusion or possession an object other than the object indicated by the object of the term. If the object of these terms implying inclusion or possession is an expression that does not specify a quantity or suggests a singular number (an expression with a or an article), the expression should be construed as not being limited to a specific number.

In the present specification (including the claims), although when the expression such as "one or more," "at least one," or the like is used in some places, and the expression that does not specify a quantity or suggests a singular number (the expression with a or an article) is used elsewhere, it is not intended that this expression means "one." In general, the expression that does not specify a quantity or suggests a singular number (the expression with a or an as article) should be interpreted as not necessarily limited to a specific number.

In the present specification, when it is stated that a particular configuration of an example results in a particular effect (advantage/result), unless there are some other reasons, it should be understood that the effect is also obtained for one or more other embodiments having the configuration. However, it should be understood that the presence or absence of such an effect generally depends on various factors, conditions, and/or states, etc., and that such an effect is not always achieved by the configuration. The effect is merely achieved by the configuration in the embodiments when various factors, conditions, and/or states, etc., are met, but the effect is not always obtained in the claimed invention that defines the configuration or a similar configuration.

In the present specification (including the claims), when the term such as "maximize/maximization" is used, this includes finding a global maximum value, finding an approximate value of the global maximum value, finding a local maximum value, and finding an approximate value of the local maximum value, should be interpreted as appropriate accordingly depending on the context in which the term is used. It also includes finding on the approximated value of these maximum values probabilistically or heuristically. Similarly, when the term such as "minimize/minimization" is used, this includes finding a global minimum value, finding an approximated value of the global minimum value, finding a local minimum value, and finding an approximated value of the local minimum value, and should be interpreted as appropriate accordingly depending on the context in which the term is used. It also includes finding the approximated value of these minimum values probabilistically or heuristically. Similarly, when the term such as "optimize/optimization" is used, this includes finding a global optimum value, finding an approximated value of the global optimum value, finding a local optimum value, and finding an approximated value of the local optimum value, and should be interpreted as appropriate accordingly depending on the context in which the term is used. It also includes finding the approximated value of these optimal values probabilistically or heuristically.

In the present specification (including claims), when a plurality of hardware performs a predetermined process, the respective hardware may cooperate to perform the predetermined process, or some hardware may perform all the predetermined process. Further, a part of the hardware may perform a part of the predetermined process, and the other hardware may perform the rest of the predetermined process. In the present specification (including claims), when an expression (including similar expressions) such as "one or more hardware perform a first process and the one or more hardware perform a second process," or the like, is used, the hardware that perform the first process and the hardware that perform the second process may be the same hardware, or may be the different hardware. That is: the hardware that perform the first process and the hardware that perform the second process may be included in the one or more hardware. Note that, the hardware may include an electronic circuit, a device including the electronic circuit, or the like.

While certain embodiments of the present disclosure have been described in detail above, the present disclosure is not limited to the individual embodiments described above. Various additions, changes, substitutions, partial deletions, etc. are possible to the extent that they do not deviate from the conceptual idea and purpose of the present disclosure derived from the contents specified in the claims and their equivalents. For example, when numerical values or mathematical formulas are used in the description in the above-described embodiments, they are shown for illustrative purposes only and do not limit the scope of the present disclosure. Further, the order of each operation shown in the embodiments is also an example, and does not limit the scope of the present disclosure.

The invention claimed is:

1. A training device comprising:

one or more memories; and one or more processors configured to:

input a first atomic structure including a surface and an adsorbed molecule close to the surface into a training target model to obtain an energy which is outputted from the training target model in response to the input, and obtain a first error based on the outputted energy of the first atomic structure and a ground truth value of the energy of the first atomic structure;

input a fourth atomic structure including a cluster and an adsorbed molecule close to the cluster into the training target model to obtain an energy which is outputted from the training target model in response to the input, and obtain a fourth error based on the outputted energy of the fourth atomic structure and a ground truth value of the energy of the fourth atomic structure; and update a parameter of the training target model based on the first error and the fourth error, wherein the surface and the cluster include the same atom.

2. The training device according to claim 1, wherein the number of atoms present in an atomic structure of the cluster is smaller than the number of atoms present in an atomic structure of the surface.

3. The training device according to claim 1, wherein the one or more processors are configured to:

further input a second atomic structure of the adsorbed molecule into the training target model to obtain an energy which is outputted from the training target model in response to the input, and obtain a second error based on the outputted energy of the second atomic structure and a ground truth value of the energy of the second atomic structure; and update the parameter of the training target model based on the second error.

4. The training device according to claim 1, wherein the one or more processors are configured to:

further input a third atomic structure of the surface into the training target model to obtain an energy which is outputted from the training target model in response to the input, and obtain a third error based on the outputted energy of the third atomic structure and a ground truth value of the energy of the third atomic structure; and update the parameter of the training target model based on the third error.

5. The training device according to claim 1, wherein the one or more processors are configured to:

further input a fifth atomic structure of the cluster into the training target model to obtain an energy which is outputted from the training target model in response to the input, and obtain a fifth error based on the outputted energy of the fifth atomic structure and a ground truth value of the energy of the fifth atomic structure; and update the parameter of the training target model based on the fifth error.

6. The training device according to claim 1, wherein, regarding an atomic structure, the one or more processors are configured to calculate an error by dividing a difference between an energy of the atomic structure which energy is outputted from the training target model and a ground truth value of the energy of the atomic structure, by the number of atoms included in the atomic structure or by a square of the number of the atoms.

7. The training device according to claim 1, wherein the ground truth value of the energy of the atomic structure is found through execution of quantum chemical calculation regarding the atomic structure.

8. The training device according to claim 7, wherein the quantum chemical calculation is first principles calculation.

9. The training device according to claim 8, wherein the first principles calculation is calculation using a density functional theory, a Hartree-Fock method, or a Møller-Plesset method.

10. The training device according to claim 1, wherein the training target model is a neural network model for representing an interatomic potential.

11. The training device according to claim 1, wherein the adsorbed molecule included in the first atomic structure and the adsorbed molecule included in the fourth atomic structure are the same.

12. The training device according to claim 1, wherein the same atoms included in the surface and the cluster are atoms having the same element symbol.

13. A method of generating a trained model by updating a parameter of a training target model, the method comprising:

inputting a first atomic structure including a surface and an adsorbed molecule close to the surface into the training target model to obtain an energy which is outputted from the training target model in response to the input, and obtaining a first error based on the outputted energy of the first atomic structure and a ground truth value of the energy of the first atomic structure;

inputting a fourth atomic structure including a cluster and an adsorbed molecule close to the cluster into the training target model to obtain an energy which is outputted from the training target model in response to the input, and obtaining a fourth error based on the outputted energy of the fourth atomic structure and a ground truth value of the energy of the fourth atomic structure; and updating the parameter of the training target model based on the first error and the fourth error, wherein the surface and the cluster include the same atoms.

14. An inferring device comprising:

one or more memories; and one or more processors configured to:

input a first atomic structure including a surface and an adsorbed molecule close to the surface, a second atomic structure of the adsorbed molecule, and a third atomic structure of the surface, into a trained model configured to output energies of the input atomic structures; and calculate an adsorption energy of the adsorbed molecule to the surface, based on the energies of the first atomic structure, the second atomic structure, and the third atomic structure which energies are outputted from the trained model, wherein the trained model is a training target model trained by a method including:

inputting an atomic structure including a surface and an adsorbed molecule close to the surface into a training target model to obtain an energy which is outputted from the training target model in response to the input, and obtaining an error based on the outputted energy of the atomic structure including the surface and a ground truth value of the energy of the atomic structure including the surface;

inputting an atomic structure including a cluster and an adsorbed molecule close to the cluster into the training target model to obtain an energy which is outputted from the training target model in response to the input, and obtaining an error based on the outputted energy of the atomic structure including the cluster and a ground truth value of the energy of the atomic structure including the cluster; and updating a parameter of the training target model based on the two errors, and wherein the surface and the cluster include the same atoms.

15. The inferring device according to claim 14, wherein, in the training of the training target model, the number of atoms present in an atomic structure of the cluster is smaller than the number of atoms present in an atomic structure of the surface.

16. The inferring device according to claim 14, wherein the trained model is capable of calculating forces acting on atoms forming the input atomic structures, and wherein the one or more processors are configured to:

optimize the first atomic structure based on the force calculated by the trained model in response to the input of the first atomic structure, and input the optimized first atomic structure into the trained model, for the calculation of the adsorption energy.

17. The inferring device according to claim 16, wherein the one or more processors are configured to repeatedly execute the optimization of the first atomic structure.

18. The inferring device according to claim 14, wherein the adsorption energy is calculated by subtracting the energy of the first atomic structure which energy is outputted from the trained model, from a sum of the energy of the second atomic structure and the energy of the third atomic structure which energies are outputted from the trained model.

19. The inferring device according to claim 14, wherein the trained model is a neural network model for representing an interatomic potential.

20. The inferring device according to claim 14, wherein the same atoms included in the surface and the cluster are atoms having the same element symbol.

21. An inferring method comprising:

inputting a first atomic structure including a surface and an adsorbed molecule close to the surface, a second atomic structure of the adsorbed molecule, and a third atomic structure of the surface, into a trained model configured to output energies of the input atomic structures; and calculating an adsorption energy of the adsorbed molecule to the surface, based on the energies of the first atomic structure, the second atomic structure, and the third atomic structure which energies are outputted from the trained model, wherein the trained model is a training target model trained by a method including:

inputting an atomic structure including a surface and an adsorbed molecule close to the surface into a training target model to obtain an energy which is outputted from the training target model in response to the input, and obtaining an error based on the outputted energy of the atomic structure including the surface and a ground truth value of the energy of the atomic structure including the surface;

inputting an atomic structure including a cluster and an adsorbed molecule close to the cluster into the training target model to obtain an energy which is outputted from the training target model in response to the input, and obtaining an error based on the outputted energy of the atomic structure including the cluster and a ground truth value of the energy of the atomic structure including the cluster; and updating a parameter of the training target model based on the two errors, and wherein the surface and the cluster include the same atoms.

* * * * *